United States Patent
Tomita et al.

(10) Patent No.: US 11,656,068 B2
(45) Date of Patent: May 23, 2023

(54) WORKPIECE DIAMETER MEASUREMENT METHOD AND WORKPIECE CIRCULARITY MEASUREMENT MACHINE

(71) Applicant: Tokyo Seimitsu Co., Ltd., Tokyo (JP)

(72) Inventors: Kosuke Tomita, Tsuchiura (JP); Ryo Takanashi, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 17/872,820

(22) Filed: Jul. 25, 2022

(65) Prior Publication Data

US 2022/0357143 A1 Nov. 10, 2022

Related U.S. Application Data

(63) Continuation of application No. PCT/JP2021/004945, filed on Feb. 10, 2021.

(30) Foreign Application Priority Data

Feb. 18, 2020 (JP) .............................. JP2020-025445

(51) Int. Cl.
*G01B 5/08* (2006.01)
*G01B 5/20* (2006.01)

(52) U.S. Cl.
CPC .......... *G01B 5/08* (2013.01); *G01B 5/20* (2013.01)

(58) Field of Classification Search
CPC ................................... G01B 5/08; G01B 5/20
See application file for complete search history.

(56) References Cited

U.S. PATENT DOCUMENTS

| | | | |
|---|---|---|---|
| 4,530,158 A | 7/1985 | Chauquet | |
| 5,926,781 A * | 7/1999 | Scott ................. | G01B 21/20 702/167 |

(Continued)

FOREIGN PATENT DOCUMENTS

| | | |
|---|---|---|
| CN | 101622513 A | 1/2010 |
| CN | 105473981 A | 4/2016 |

(Continued)

OTHER PUBLICATIONS

International Search Report for PCT/JP2021/004945 (PCT/ISA/210) dated May 11, 2021.

(Continued)

*Primary Examiner* — John Fitzgerald
*Assistant Examiner* — Tania Courson
(74) *Attorney, Agent, or Firm* — Birch, Stewart, Kolasch & Birch, LLP

(57) ABSTRACT

A workpiece diameter measurement method includes: detecting positions of a probe while relatively rotating an uncalibrated standard and a detector around a rotation center in a state where the probe is in contact with a circumferential face of the standard from one side in a displacement direction of the probe, detecting the positions of the probe while relatively rotating the standard and the detector around the rotation center in a state where the probe is in contact with the circumferential face from another side in the displacement direction, calculating the position of the rotation center based on the detected positions, relatively rotating a workpiece and the detector around the rotation center in a state where the probe is in contact with the workpiece from the other side, and calculating a diameter of a circumferential face of the workpiece.

5 Claims, 13 Drawing Sheets

(56) References Cited

U.S. PATENT DOCUMENTS

| | | | | |
|---|---|---|---|---|
| 6,065,220 | A * | 5/2000 | Ohtsuka | G01B 5/12 33/549 |
| 6,327,788 | B1 * | 12/2001 | Seddon | G01B 5/008 33/550 |
| 7,197,835 | B2 * | 4/2007 | Takanashi | G01B 5/0002 33/503 |
| 7,918,036 | B2 * | 4/2011 | Ishikawa | G01B 5/20 33/503 |
| 9,581,424 | B2 * | 2/2017 | Takanashi | G01B 5/201 |
| 10,041,779 | B2 * | 8/2018 | Masuta | G01B 5/201 |
| 2005/0132591 | A1 * | 6/2005 | Kojima | G01B 5/28 33/503 |
| 2006/0085995 | A1 * | 4/2006 | Katamachi | G01B 5/0016 33/550 |
| 2009/0259435 | A1 | 10/2009 | Enomoto et al. | |
| 2010/0018069 | A1 | 1/2010 | Ould | |
| 2012/0185210 | A1 | 7/2012 | Takanashi | |
| 2015/0082651 | A1 * | 3/2015 | Yeh | G01B 5/201 33/831 |
| 2016/0116275 | A1 | 4/2016 | Matsushita et al. | |
| 2016/0138911 | A1 | 5/2016 | Wallace et al. | |
| 2018/0149457 | A1 | 5/2018 | Masuta | |

FOREIGN PATENT DOCUMENTS

| | | |
|---|---|---|
| CN | 105547072 A | 5/2016 |
| EP | 2 840 354 A1 | 2/2015 |
| JP | 1-259211 A | 10/1989 |
| JP | 2012-108143 A | 6/2012 |
| JP | 2012-145494 A | 8/2012 |
| JP | 2017-187464 A | 10/2017 |

OTHER PUBLICATIONS

Written Opinion of the International Searching Authority for PCT/JP2021/004945 (PCT/ISA/237) dated May 11, 2021.

Chinese Office Action and Search Report for corresponding Chinese Application No. 202180011436.9, dated Dec. 14, 2022, with English translation.

\* cited by examiner

FIG.3
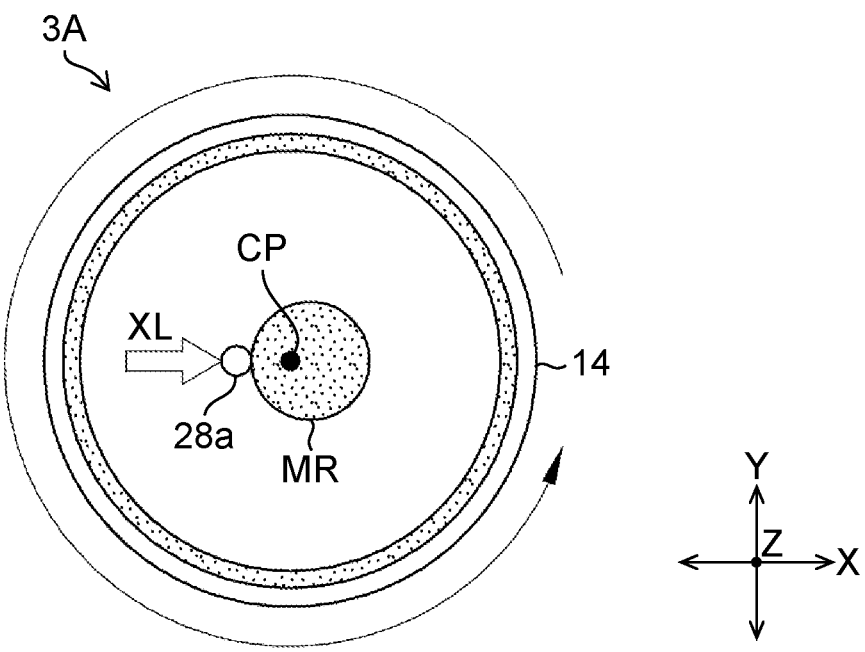
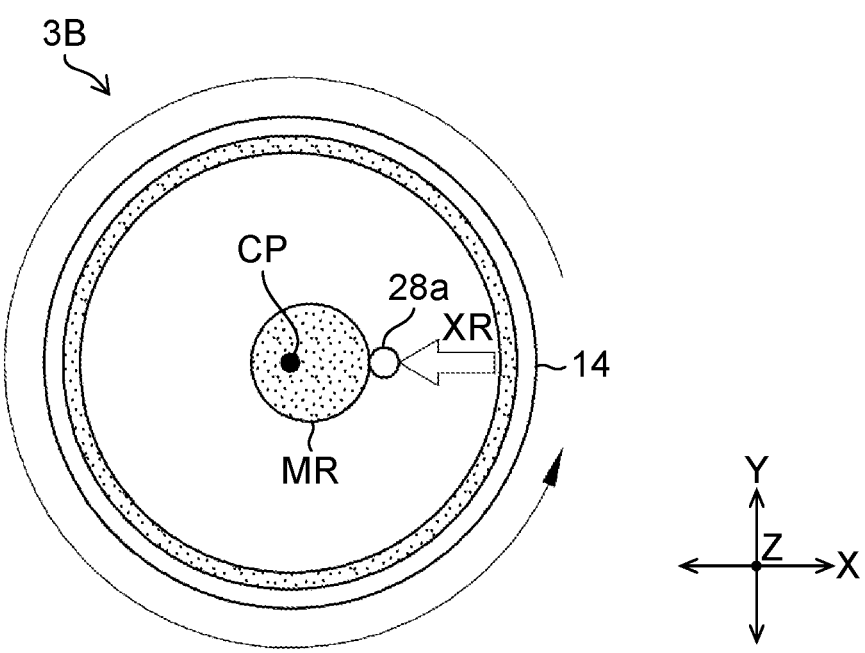

FIG.5
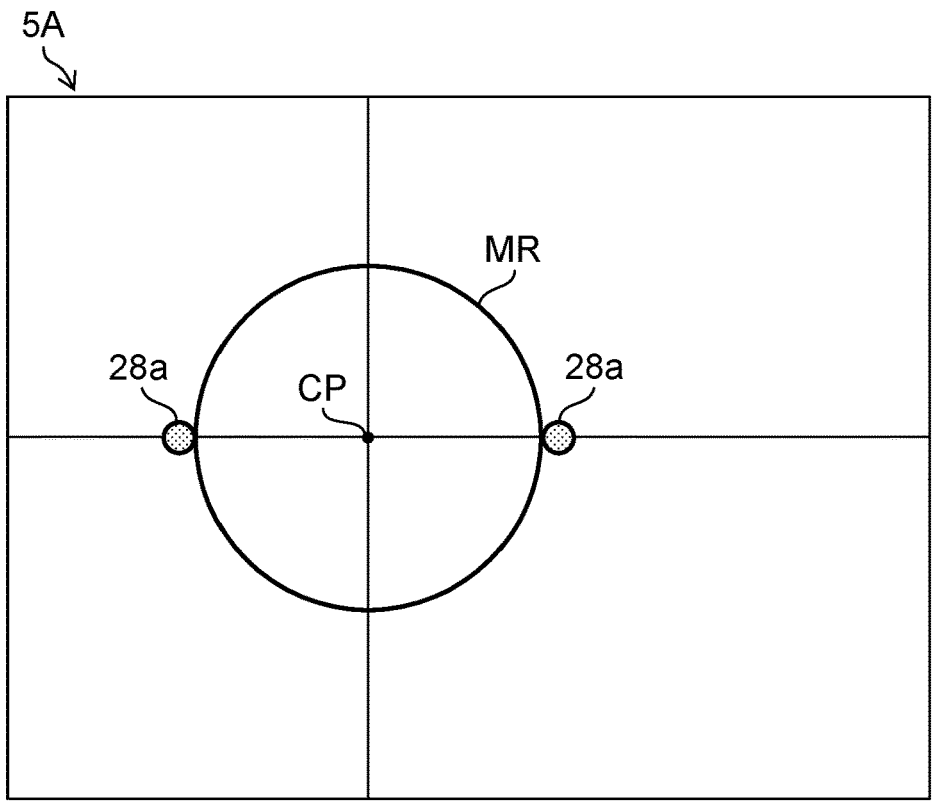
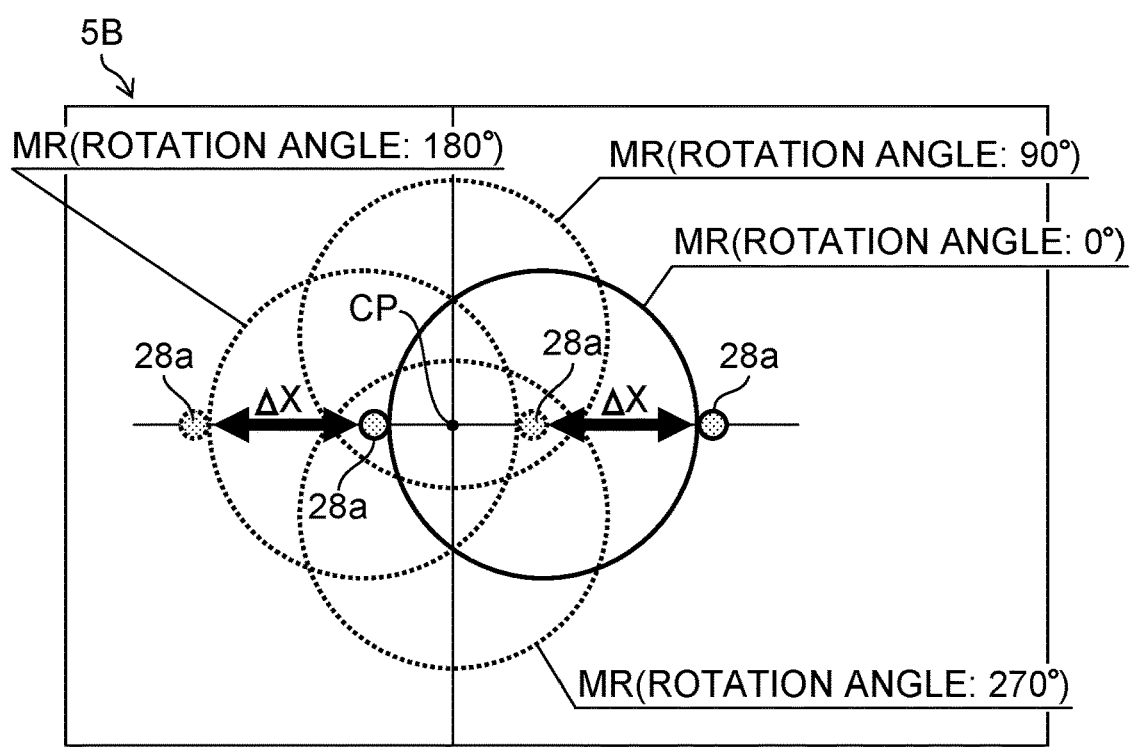

FIG.12
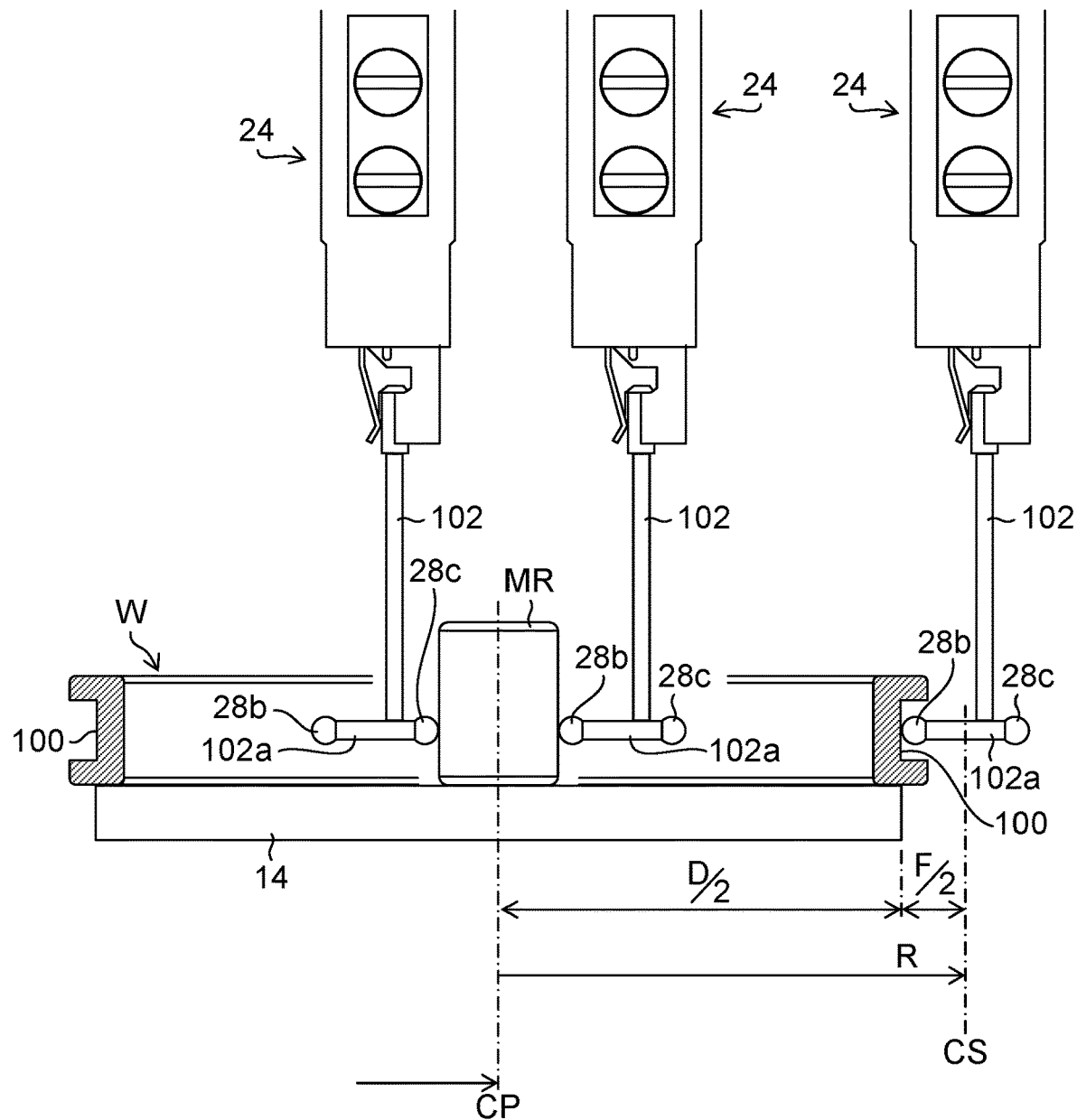
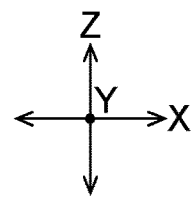

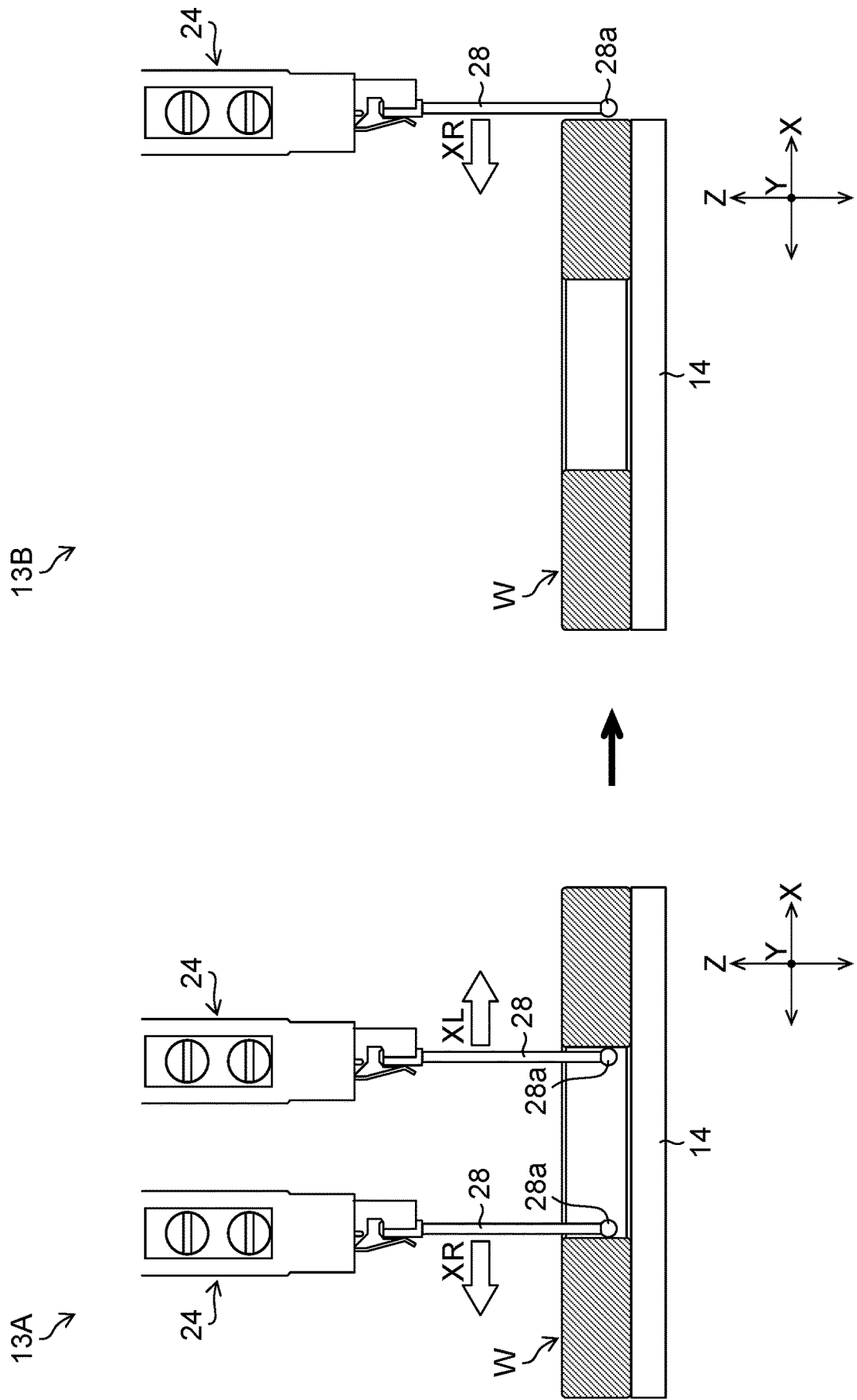

WORKPIECE DIAMETER MEASUREMENT METHOD AND WORKPIECE CIRCULARITY MEASUREMENT MACHINE

CROSS-REFERENCE TO RELATED APPLICATIONS

The present application is a Continuation of PCT International Application No. PCT/JP2021/004945 filed on Feb. 10, 2021 claiming priority under 35 U.S.C. § 119(a) to Japanese Patent Application No. 2020-025445 filed on Feb. 18, 2020. Each of the above applications is hereby expressly incorporated by reference, in their entirety, into the present application.

BACKGROUND OF THE INVENTION

1. Field of the Invention

The present invention relates to a workpiece diameter measurement method and a circularity measurement machine that measure a diameter of a circumferential face of a workpiece.

2. Description of the Related Art

A circularity measurement machine that measures the circularity of a workpiece having a solid cylindrical shape or a hollow cylindrical shape (including a hollow cylindrical shape measurement machine) is known. The circularity measurement machine measures a circularity of a workpiece based on the result of detecting displacement of a probe using a detector while rotating a rotary table in a state where the probe is in contact with the outer circumferential face of the workpiece placed on the rotary table. Also, the diameter of the circumferential face of the workpiece can be measured by using the circularity measurement machine (refer to Patent Literatures 1 and 2).

Patent Literature 1 discloses a circularity measurement machine including a rotary table, a first detector, a horizontal arm that guides a contact of the first detector with respect to a workpiece horizontally and in a direction of the diameter of the workpiece, and a second detector that detects a horizontal movement amount of the horizontal arm. In this circularity measurement machine, a master piece having a known diameter is first placed on the rotary table. The contactor of the first detector is brought into contact with the right side face of the master piece, and the second detector performs reading. Thereafter, the contactor of the first detector is brought into contact with the left side face of the master piece, and the second detector performs reading. Next, an error value of the circularity measurement machine is calculated based on two reading results obtained by the second detector and the known dimension of the master piece. Then, after a workpiece is placed on the rotary table in replacement of the master piece, the diameter dimension of the workpiece is measured in a similar manner, and error correction for the diameter dimension is performed based on the error value previously obtained.

Patent Literature 2 discloses a method including moving a detector parallel to a center line of measurement with respect to a master piece having a known diameter value, performing measurement at two detection points opposite to each other on the master piece, and calculating a center deviation amount based on the difference between the measured values. According to this method, even when the diameter value of the master piece and the diameter value of the workpiece differ from each other, the diameter value of the workpiece can be accurately calculated without being influenced by the center deviation amount of the circularity measurement machine.

CITATION LIST

Patent Literature 1: Japanese Patent Application Laid-Open No. 1-259211
Patent Literature 2: Japanese Patent Application Laid-Open No. 2012-145494

SUMMARY OF THE INVENTION

The methods disclosed in Patent Literatures 1 and 2 require the master piece to measure the diameter of the workpiece; however, the master piece is expensive since the diameter value thereof needs to be guaranteed. Also, in the methods disclosed in Patent Literatures 1 and 2, the horizontal arm having a stroke longer than the diameter (outer diameter) of the workpiece needs to be prepared to bring the probe into contact with the two opposite detection points on the workpiece, and such a horizontal arm is disadvantageously expensive and heavy. Thus, it is difficult for the conventional circularity measurement machines to perform diameter measurement on a workpiece having a large diameter.

The present invention has been made in view of such circumstances, and an object thereof is to provide a workpiece diameter measurement method and a circularity measurement machine that can perform diameter measurement on a workpiece having a large diameter without using a master piece and a horizontal arm having a long stroke.

A workpiece diameter measurement method for achieving the object of the present invention is a workpiece diameter measurement method for measuring a diameter of a workpiece using a circularity measurement machine that rotates the workpiece placed on a table and a detector relative to each other around a rotation center in a state where a probe of the detector is in contact with a circumferential face of the workpiece, the workpiece diameter measurement method including: a first detection step of detecting positions of the probe while rotating a standard uncalibrated and placed on the table and the detector relative to each other around the rotation center in a state where the probe is in contact with a circumferential face of the standard from one side in a displacement direction of the probe; a second detection step of detecting positions of the probe while rotating the standard and the detector relative to each other around the rotation center in a state where the probe is in contact with the circumferential face of the standard from another side in the displacement direction; a rotation center calculating step of calculating a position of the rotation center based on the positions of the probe detected in the first detection step and the second detection step; a third detection step of detecting positions of the probe while rotating the workpiece and the detector relative to each other around the rotation center in a state where the probe is in contact with the workpiece from the other side; and a diameter calculating step of calculating a diameter of the circumferential face of the workpiece based on the positions of the probe detected in the first detection step, the second detection step, and the third detection step.

According to this workpiece diameter measurement method, the position of the rotation center can be measured using the uncalibrated standard, which enables alignment between the center of the workpiece and the rotation center.

As a result, the diameter of the workpiece can be measured merely by rotating the detector and the workpiece relative to each other around the rotation center in a state where the probe is in contact with one detection point on the workpiece. Thus, it is possible to perform diameter measurement on a workpiece having a large diameter without using a master piece and a horizontal arm having a long stroke. Also, since the position of the rotation center can be measured regardless of the presence or absence of an offset of the center of the standard from the rotation center, it is possible to reduce the operator's time and effort and also shorten the measuring time.

A workpiece diameter measurement method according to another aspect of the present invention is configured such that the standard and the detector are rotated relative to each other around the rotation center by rotating the table, and in the rotation center calculating step, the position CP of the rotation center is calculated by using a formula [CP=A+(B−A)/2=(A+B)/2], where A is a mean value of the positions of the detector detected in the first detection step, and B is a mean value of the positions of the detector detected in the second detection step. Accordingly, it is possible to measure the position of the rotation center regardless of the presence or absence of an offset of the center of the standard from the rotation center.

A workpiece diameter measurement method according to still another aspect of the present invention is configured such that the workpiece and the detector are rotated relative to each other around the rotation center by rotating the table, and in the diameter calculating step, an approximate radius R of the workpiece is calculated by using a formula [R=C−(A+B)/2], and the diameter D of the circumferential face of the workpiece is calculated by using a formula [D=(R−E/2)×2], where C is a mean value of the positions of the detector detected in the third detection step, and E is a diameter of a tip ball of the probe. Accordingly, it is possible to perform diameter measurement on a workpiece having a large diameter without using a master piece and a horizontal arm having a long stroke.

A workpiece diameter measurement method according to still another aspect of the present invention is configured such that, when the workpiece has a first circumferential face serving as the circumferential face of the workpiece and a second circumferential face concentric with the first circumferential face, the second circumferential face is used as the circumferential face of the standard. This can reduce the cost.

A circularity measurement machine for achieving the object of the present invention is a circularity measurement machine that rotates a workpiece placed on a table and a detector relative to each other around a rotation center in a state where a probe of the detector is in contact with a circumferential face of the workpiece, the circularity measurement machine including: a first detection control unit that detects positions of the probe while rotating a standard uncalibrated and placed on the table and the detector relative to each other around the rotation center in a state where the probe is in contact with a circumferential face of the standard from one side in a displacement direction of the probe; a second detection control unit that detects positions of the probe while rotating the standard and the detector relative to each other around the rotation center in a state where the probe is in contact with the circumferential face of the standard from another side in the displacement direction; a rotation center calculating unit that calculates a position of the rotation center based on the positions of the probe detected by the first detection control unit and the second detection control unit; a third detection control unit that detects positions of the probe while rotating the workpiece and the detector relative to each other around the rotation center in a state where the probe is in contact with the workpiece from the other side; and a diameter calculating unit that calculates a diameter of the circumferential face of the workpiece based on the positions of the probe detected by the first detection control unit, the second detection control unit, and the third detection control unit.

The present invention enables diameter measurement on a workpiece having a large diameter without using a master piece and a horizontal arm having a long stroke.

BRIEF DESCRIPTION OF THE DRAWINGS

FIG. 3 is an explanatory diagram for explaining control of a motor, a detector, and a position detecting unit by a pre-detection control unit;

FIG. 5 is an explanatory diagram illustrating displacement of a position of a probe in first detection control and second detection control;

FIG. 12 is an explanatory diagram for explaining measurement of a diameter of a workpiece whose outer circumferential face has a recessed cross-sectional shape; and FIG. 13 is an explanatory diagram for explaining an example in which a diameter of a workpiece is measured without additionally providing a standard by using a portion of the workpiece as a standard.

DESCRIPTION OF THE PREFERRED EMBODIMENTS

[Entire Configuration of Circularity Measurement Machine]

Figure 1:
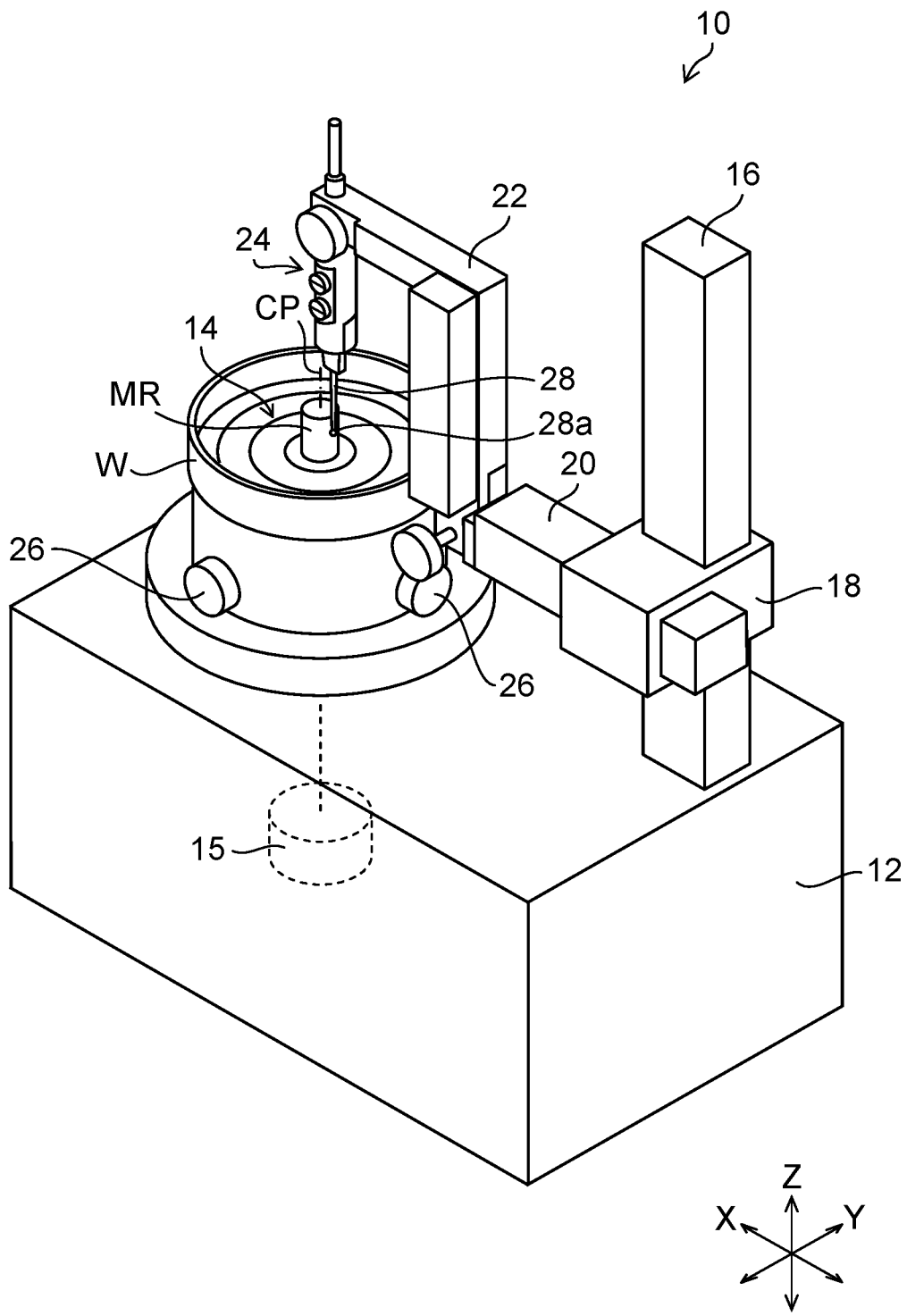
FIG. 1 is an external perspective view of a circularity measurement machine.

FIG. 1 is an external perspective view of a circularity measurement machine 10. Here, in the drawing, of XYZ directions perpendicular to each other, the XY directions are horizontal directions, and the Z direction is an up-down direction (height direction). As illustrated in FIG. 1, the circularity measurement machine 10 measures the diameter (outer diameter) of the outer circumferential face of a workpiece W having a large diameter in addition to the circularity and the diameter of a workpiece W having a circumferential face having, for example, a hollow cylindrical shape, a solid cylindrical shape, or a discoid shape. Hereinbelow, in the present embodiment, diameter measurement performed by the circularity measurement machine 10 on the outer circumferential face of the workpiece W having a large diameter and a hollow cylindrical shape is specifically described. Since measurement of the circularity of a workpiece W is a known technique, detailed description thereof is omitted.

The circularity measurement machine 10 includes a base 12, a rotary table 14 (also referred to as a stage), a motor 15, a column 16 (also referred to as a post), a carriage 18 (also referred to as a slider), a horizontal arm 20, a detector holder 22, and a detector 24.

The base 12 is a support base (base stand) that supports each part of the circularity measurement machine 10. The rotary table 14 and the column 16 are provided on the upper face of the base 12. Also, the motor 15 is provided inside the base 12.

The rotary table 14 (corresponding to the table of the prevent invention) is supported rotatably by the motor 15 through a bearing such as an air bearing. On the upper face of the rotary table 14, the workpiece W to be subjected to diameter measurement, the workpiece W having a hollow cylindrical shape (annular shape) and a large diameter, and a standard MR used to measure the rotation center CP of the rotary table 14 are placed.

The standard MR is formed in a solid cylindrical shape (can also be a hollow cylindrical shape or a discoid shape) having a diameter smaller than the inner diameter of the workpiece W and placed inside the workpiece W on the rotary table 14. The standard MR differs from the master piece described in Patent Literatures 1 and 2 described above in that the standard MR is uncalibrated (unguaranteed), that is, its diameter value or the like is not guaranteed. Thus, the standard MR is lower in cost than the master piece.

Also, the rotary table 14 is provided with a rotation center adjusting mechanism 26 used to adjust the position of the rotary table 14 in the XY directions (can also be used to adjust a tilt in the XY directions). Alignment between the center of the workpiece W and the rotation center CP of the rotary table 14 can be performed by operating the rotation center adjusting mechanism 26 and the like.

The motor 15 rotates the rotary table 14 through a drive transmitting mechanism (not illustrated) under control of a control device 30 (refer to FIG. 2), which is described further below, in measuring the diameter and the circularity of the workpiece W. Note that a known rotation driving mechanism other than the motor 15 may be used to rotate the rotary table 14.

The column 16 is provided on the upper face of the base 12 beside the rotary table 14 in the X direction and has a shape extending in the Z direction. The carriage 18 is provided on the column 16 movably in the Z direction.

The horizontal arm 20 is provided on the carriage 18 movably in the X direction. The horizontal arm 20 has a shape extending in the X direction, and the detector 24 is provided on the tip side of the horizontal arm 20 through the detector holder 22.

The detector 24 includes a probe 28 and a displacement detecting unit (not illustrated) such as a differential transformer. The detector 24 detects displacement of the probe 28 moving back and forth in the X direction (displacement direction) and outputs a displacement detection signal indicating the displacement to the control device 30 (refer to FIG. 2), which is described further below. The probe 28 is provided with a tip ball 28a on the tip portion thereof. The tip ball 28a comes into contact with the outer circumferential face of the workpiece W and the outer circumferential face of the standard MR. Here, since the configuration of the detector 24 is known, detailed description thereof is omitted.

Figure 2:
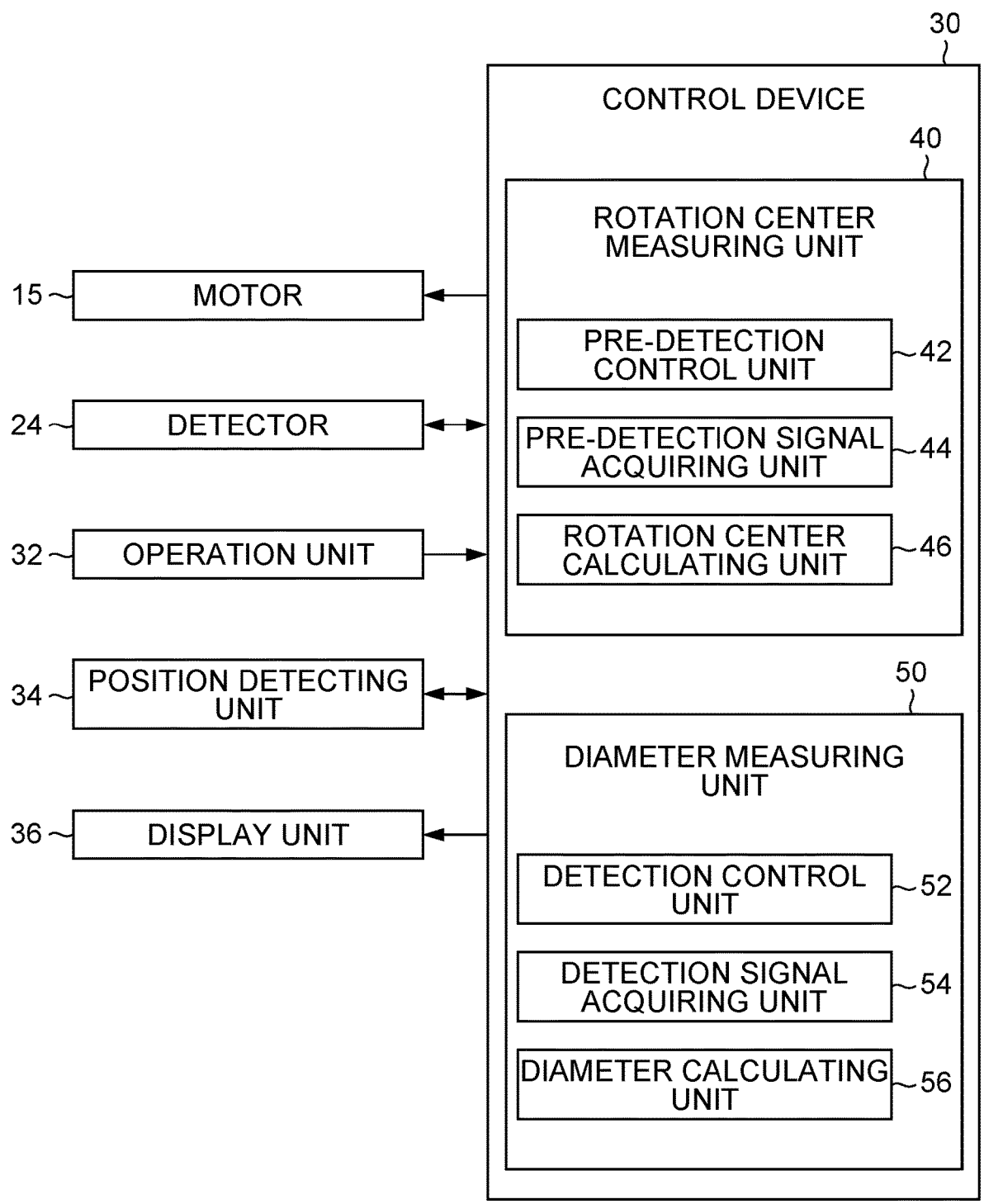
FIG. 2 is a functional block diagram of a control device of the circularity measurement machine.

FIG. 2 is a functional block diagram of the control device 30 of the circularity measurement machine 10. As illustrated in FIG. 2, the control device 30 includes, for example, an arithmetic device such as a personal computer. The control device 30 controls, in a centralized manner, operations of respective parts of the circularity measurement machine 10, and calculates the rotation center CP of the rotary table 14 and calculates the diameter, the circularity, and the like of the workpiece W. The control device 30 includes an arithmetic circuit including various processors, a memory, and the like. The various processors include, for example, a central processing unit (CPU), a graphics processing unit (GPU), an application specific integrated circuit (ASIC), and programmable logic devices [e.g., simple programmable logic devices (SPLD), a complex programmable logic device (CPLD), and field programmable gate arrays (FPGA)]. Note that various functions of the control device 30 may be implemented by one processor or may be implemented by a plurality of processors of the same type or different types.

In addition to the motor 15 and the detector 24 described above, an operation unit 32, a position detecting unit 34, a display unit 36, and the like are connected to the control device 30.

A keyboard, a mouse, an operation panel, an operation button, and the like are used as the operation unit 32. The operation unit 32 accepts input of various operations by an operator.

The position detecting unit 34 includes, for example, an X-direction linear encoder that detects the position of the horizontal arm 20 that moves the detector 24 in the X direction and a Z-direction linear encoder that detects the position of the carriage 18 that moves the detector 24 in the Z direction. The position detecting unit 34 outputs a position detection signal output from each of the linear encoders to the control device 30. This enables the control device 30 to detect the position (the X-direction position and the Z-direction position) of the detector 24 based on the position detection signals input thereto from the position detecting unit 34.

Various known monitors are used as the display unit 36. The display unit 36 displays the result of calculation of the rotation center CP of the rotary table 14 calculated by a rotation center calculating unit 46, which is described further below, the result of calculation of the diameter of the workpiece W by a diameter calculating unit 56, and the like.

In the circularity measurement machine 10, the position of the rotation center CP of the rotary table 14 is first measured using the standard MR, and the center of the workpiece W and the rotation center CP of the rotary table 14 are aligned with each other based on the result of the measurement. Then, the diameter of the outer circumferential face of the workpiece W is measured.

[Control Device]

The control device 30 functions as a rotation center measuring unit 40 that measures the position of the rotation center CP of the rotary table 14 and a diameter measuring unit 50 that measures the diameter of the outer circumferential face of the workpiece W by executing a control program (not illustrated) stored in a storage unit (not illustrated). Note that one described as "unit" of the control device 30 may be "circuit", "apparatus" or "device". That is, one described as "unit" may include any of firmware, software, hardware, and a combination of these.

<Measurement of Position of Rotation Center>

The rotation center measuring unit 40 functions as a pre-detection control unit 42, a pre-detection signal acquiring unit 44, and a rotation center calculating unit 46.

The pre-detection control unit 42 controls the motor 15, the detector 24, and the position detecting unit 34 in measuring the position of the rotation center CP of the rotary table 14.

FIG. 3 is an explanatory diagram for explaining control of the motor 15, the detector 24, and the position detecting unit 34 by the pre-detection control unit 42. Note that the standard MR and the workpiece W are previously placed (set) on the rotary table 14. Further, approximate alignment between the center of the standard MR and the rotation center CP (estimated position) is previously performed by a known method using the detector 24, the rotation center adjusting mechanism 26, and the like.

As illustrated in a portion designated by reference character 3A of FIG. 3, an operator brings the tip ball 28*a* of the probe 28 into contact with the outer circumferential face of the standard MR from any one side XL in the X direction, which is a displacement direction thereof, and then inputs a detection start operation on the operation unit 32. Accordingly, the pre-detection control unit 42 functions as the first detection control unit of the present invention to start first detection control.

The pre-detection control unit 42 drives the motor 15 to cause the rotary table 14 to make one rotation in the first detection control. Accordingly, the standard MR and the detector 24 can be rotated relative to each other around the rotation center CP in a state where the probe 28 is in contact with the outer circumferential face of the standard MR from the one side XL. Further, the pre-detection control unit 42 causes the detector 24 to continuously detect X-direction displacement of the probe 28 and output the displacement detection signals to the pre-detection signal acquiring unit 44 during the rotation of the rotary table 14. Furthermore, at any timing before, during, or after the rotation of the rotary table 14, the pre-detection control unit 42 causes the position detecting unit 34 to output, to the pre-detection signal acquiring unit 44, the position detection signals for the detector 24. Based on the displacement detection signal and the position detection signals, the position of the probe 28 (the position of the tip ball 28*a*) while the rotary table 14 is being rotated in the first detection control, that is, position coordinates in any coordinate system of the circularity measurement machine 10 can be obtained.

As illustrated in a portion designated by reference character 3B of FIG. 3, after completion of the first detection control, the operator brings the tip ball 28*a* of the probe 28 into contact with the outer circumferential face of the standard MR from another side XR (the side opposite to the one side XL) in the X direction, which is the displacement direction, and then inputs a detection start operation on the operation unit 32. Accordingly, the pre-detection control unit 42 functions as the second detection control unit of the present invention to start second detection control.

The pre-detection control unit 42 drives the motor 15 to cause the rotary table 14 to make one rotation also in the second detection control. Accordingly, the standard MR and the detector 24 can be rotated relative to each other around the rotation center CP in a state where the probe 28 is in contact with the outer circumferential face of the standard MR from the other side XR. Further, as with the first detection control described above, the pre-detection control unit 42 causes the detector 24 to continuously output the displacement detection signals to the pre-detection signal acquiring unit 44 during the rotation of the rotary table 14 and causes the position detecting unit 34 to output the position detection signals to the pre-detection signal acquiring unit 44 at any timing described above. Accordingly, the positions (position coordinates) of the probe 28 while the rotary table 14 is being rotated in the second detection control can be obtained.

Note that, in the first detection control and the second detection control, since the approximate alignment between the center of the standard MR and the rotation center CP has been performed, the tip ball 28*a* is kept in contact with the outer circumferential face of the standard MR during one rotation of the rotary table 14. In other words, the approximate alignment means that the center of the standard MR and the rotation center CP are aligned with each other to the extent that the tip ball 28*a* is kept in contact with the outer circumferential face of the standard MR during one rotation of the rotary table 14.

Referring back to FIG. 2, in the first detection control and the second detection control, the pre-detection signal acquiring unit 44 functions as an interface that receives input of the displacement detection signal from the detector 24 and input of the position detection signal from the position detecting unit 34. In both the first detection control and the second detection control, the pre-detection signal acquiring unit 44 continuously acquires the displacement detection signals from the detector 24 and outputs the acquired displacement detection signals to the rotation center calculating unit 46 during one rotation of the rotary table 14, and acquires the position detection signals from the position detecting unit 34 at any timing and outputs the acquired position detection signals to the rotation center calculating unit 46.

Figure 4:
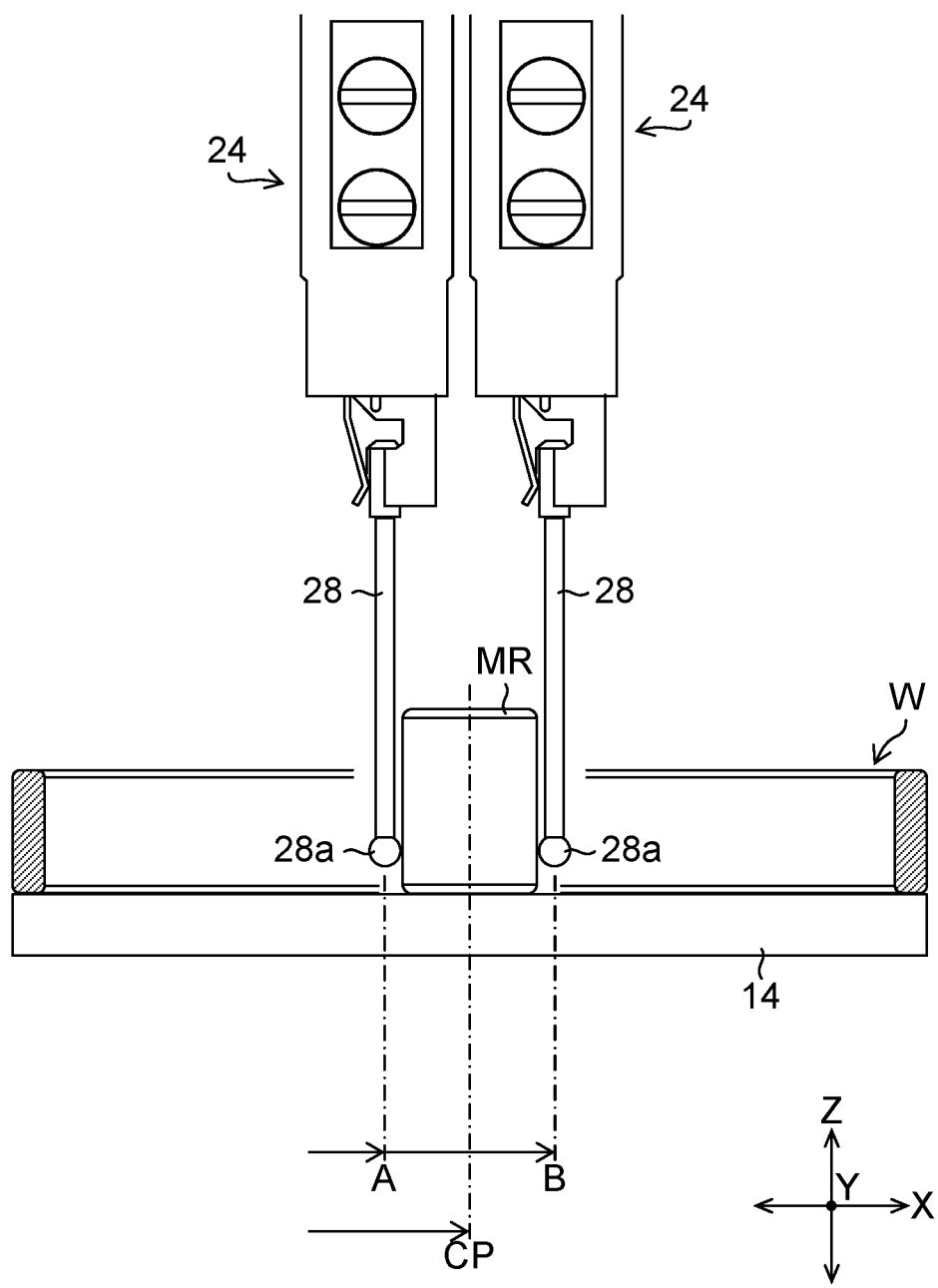
FIG. 4 is an explanatory diagram for explaining calculation of a rotation center of a rotary table by a rotation center calculating unit.

FIG. 4 is an explanatory diagram for explaining calculation of the rotation center CP of the rotary table 14 by the rotation center calculating unit 46. As illustrated in FIG. 4 and FIG. 2 described above, the rotation center calculating unit 46 calculates a mean value A of the positions of the probe 28 (the tip ball 28*a*) during one rotation of the rotary table 14 based on the displacement detection signals and the position detection signals input thereto from the pre-detection signal acquiring unit 44 in the first detection control. Further, the rotation center calculating unit 46 calculates a mean value B of the positions of the probe 28 during one rotation of the rotary table 14 based on the displacement detection signals and the position detection signals input thereto from the pre-detection signal acquiring unit 44 in the second detection control.

Then, the rotation center calculating unit 46 calculates the position of the rotation center CP of the rotary table 14 in the coordinate system described above based on the mean value A and the mean value B using the formula [CP=A+(B−A)/2=(A+B)/2].

As described above, in the present embodiment, the position of the rotation center CP of the rotary table 14 can be measured by executing measurement at the two detection points opposite to each other in the X direction (continuously acquiring the displacement detection signals and acquiring the position detection signals) by the first detection control and the second detection control. Also, in this case, even if the center of the standard MR and the rotation center CP of the rotary table 14 do not precisely coincide with each other, that is, the center of the standard MR is offset from the rotation center CP, the position of the rotation center CP can be measured. Hereinbelow, the reason thereof is explained.

FIG. 5 is an explanatory diagram illustrating displacement of the position of the probe 28 (the tip ball 28a) in the first detection control and the second detection control. Here, a portion designated by reference character 5A of FIG. 5 illustrates displacement of the position of the probe 28 when the rotation center CP of the rotary table 14 and the center of the standard MR coincide with each other (an offset amount=0), and a portion designated by reference character 5B illustrates displacement of the position of the probe 28 when the center of the standard MR is offset from the rotation center CP.

As illustrated in the portion designated by reference character 5A of FIG. 5, when the rotation center CP of the rotary table 14 and the center of the standard MR coincide with each other, the position of the probe 28 is substantially fixed during one rotation of the rotary table 14. On the other hand, as illustrated in the portion designated by reference character 5B of FIG. 5, when the center of the standard MR is offset from the rotation center CP, the position of the probe 28 is displaced in ΔX in the X direction during one rotation of the rotary table 14.

Figure 6:
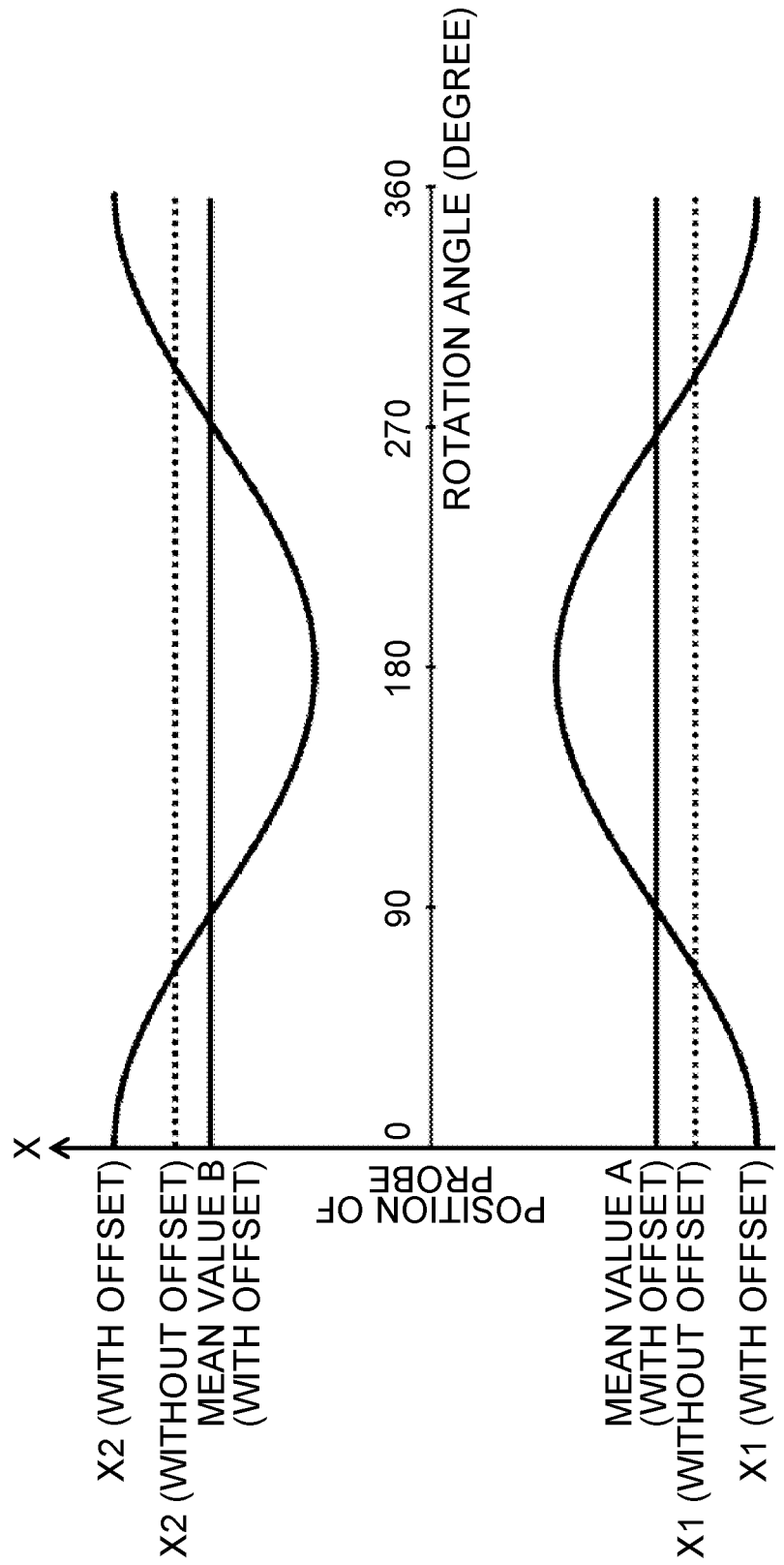
FIG. 6 is a graph illustrating a displacement of the position of the probe in the first detection control and the second detection control.

FIG. 6 is a graph illustrating the displacement of the position of the probe 28 in the first detection control and the second detection control. Here, X1 (without offset) represents the displacement of the position of the probe 28 in the first detection control when the rotation center CP and the center of the standard MR coincide with each other. X1 (with offset) represents the displacement of the position of the probe 28 in the first detection control when the center of the standard MR is offset from the rotation center CP. The mean value A (with offset) represents the mean value of X1 (with offset). X2 (without offset) represents the displacement of the position of the probe 28 in the second detection control when the rotation center CP and the center of the standard MR coincide with each other. X2 (with offset) represents the displacement of the position of the probe 28 in the second detection control when the center of the standard MR is offset from the rotation center CP. The mean value B (with offset) represents the mean value of X2 (with offset).

Figure 7:
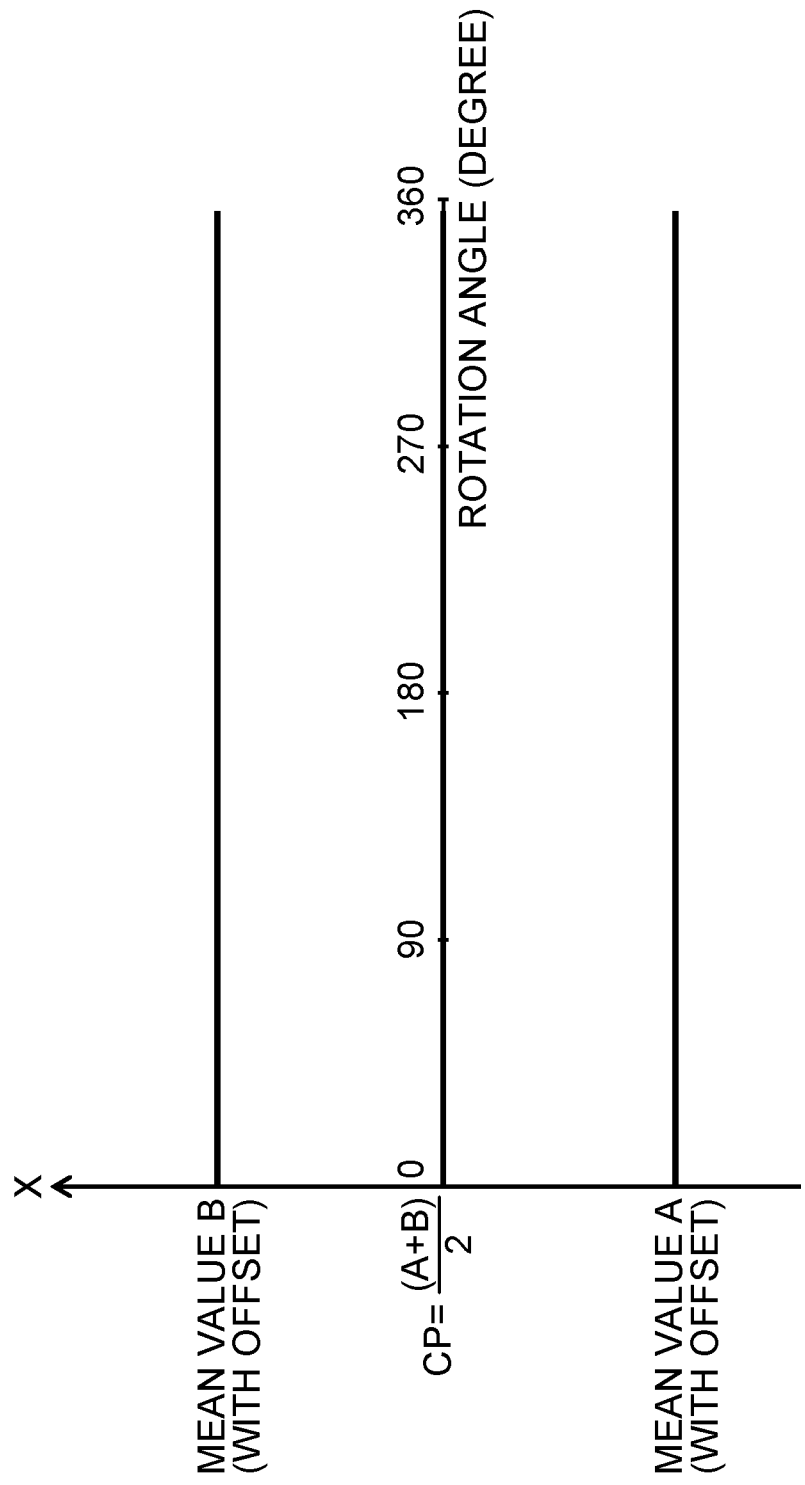
FIG. 7 is an explanatory diagram for explaining a position of the rotation center obtained based on mean values A and B (with offset) in FIG. 6.

FIG. 7 is an explanatory diagram for explaining the position of the rotation center CP [CP=(A+B)/2] obtained based on the mean values A and B (with offset) in FIG. 6.

As illustrated in FIG. 6, the mean value of X1 (without offset) and the mean value A (with offset) are not equal to each other. Also, the mean value of X2 (without offset) and the mean value B (with offset) are not equal to each other. That is, depending on the presence or absence of an offset of the center of the standard MR from the rotation center CP of the rotary table 14, a difference arises in the mean value A during one rotation of the rotary table 14, and a difference arises in the mean value B during one rotation of the rotary table 14. Thus, when the center of the standard MR is offset from the rotation center CP, executing only one of the first detection control and the second detection control cannot accurately obtain the position of the rotation center CP.

On the other hand, as illustrated in FIG. 7, the influence of the offset of the center of the standard MR from the rotation center CP can be ignored by executing both the first detection control and the second detection control and obtaining the position of the rotation center CP of the rotary table 14 from the mean value A (with offset) and the mean value B (with offset). As a result, even if the center of the standard MR is offset from the rotation center CP, the position of the rotation center CP can be measured. This eliminates the necessity of precise alignment between the rotation center CP and the center of the standard MR. Thus, it is possible to reduce the operator's time and effort and also shorten the measuring time.

Referring back to FIG. 2, the rotation center calculating unit 46 displays the result of the measurement of the position of the rotation center CP of the rotary table 14 on the display unit 36. Accordingly, the operator can perform alignment between the center of the workpiece W and the rotation center CP (measured value) through a known method using the detector 24, the rotation center adjusting mechanism 26, and the like.

<Measurement of Workpiece Diameter>

The diameter measuring unit 50 functions as a detection control unit 52, a detection signal acquiring unit 54, and a diameter calculating unit 56.

The detection control unit 52 controls the motor 15, the detector 24, and the position detecting unit 34 in measuring the diameter of the workpiece W.

Figure 8:
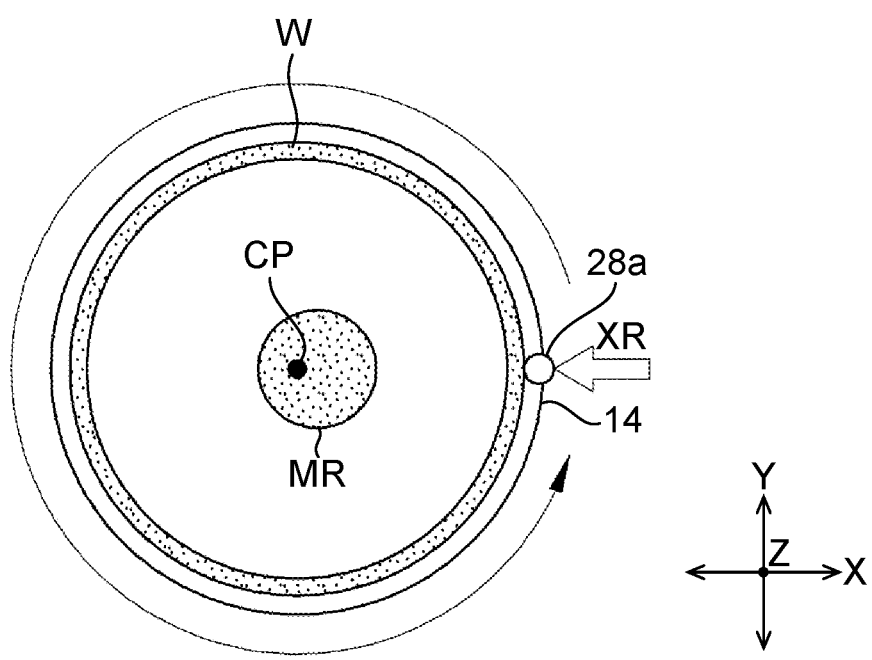
FIG. 8 is an explanatory diagram for explaining control of the motor, the detector, and the position detecting unit by a detection control unit.

FIG. 8 is an explanatory diagram for explaining control of the motor 15, the detector 24, and the position detecting unit 34 by the detection control unit 52. Note that, as described above, the alignment between the center of the workpiece W and the rotation center CP has been completed based on the result of the measurement of the rotation center CP of the rotary table 14 by the rotation center measuring unit 40.

As illustrated in FIG. 8, an operator brings the tip ball 28a of the probe 28 into contact with the outer circumferential face of the workpiece W from the other side XR and then inputs a detection start operation on the operation unit 32. Accordingly, the detection control unit 52 functions as the third detection control unit of the present invention to start third detection control.

The detection control unit 52 drives the motor 15 to cause the rotary table 14 to make one rotation in the third detection control. Accordingly, the workpiece W and the detector 24 can be rotated relative to each other around the rotation center CP in a state where the probe 28 is in contact with the outer circumferential face of the workpiece W from the other side XR. Further, at the same time, as with the first detection control and the second detection control described above, the detection control unit 52 causes the detector 24 to continuously output the displacement detection signals to the detection signal acquiring unit 54 during the rotation of the rotary table 14 and causes the position detecting unit 34 to output the position detection signals to the detection signal acquiring unit 54 at any timing. Accordingly, the positions (position coordinates) of the probe 28 while the rotary table 14 is being rotated in the third detection control can be obtained.

Note that, in the third detection control, since the alignment between the center of the workpiece W and the rotation center CP of the rotary table 14 has been performed, the tip ball 28a is kept in contact with the outer circumferential face of the workpiece W during one rotation of the rotary table 14.

Referring back to FIG. 2, in the third detection control, the detection signal acquiring unit 54 functions as an interface that receives input of the displacement detection signal from the detector 24 and input of the position detection signal from the position detecting unit 34. In the third detection control, the detection signal acquiring unit 54 continuously acquires the displacement detection signals from the detector 24 and outputs the acquired displacement detection signals to the diameter calculating unit 56 during one rotation of the rotary table 14, and acquires the position detection signals from the position detecting unit 34 at any timing and outputs the acquired position detection signals to the diameter calculating unit 56.

Figure 9:
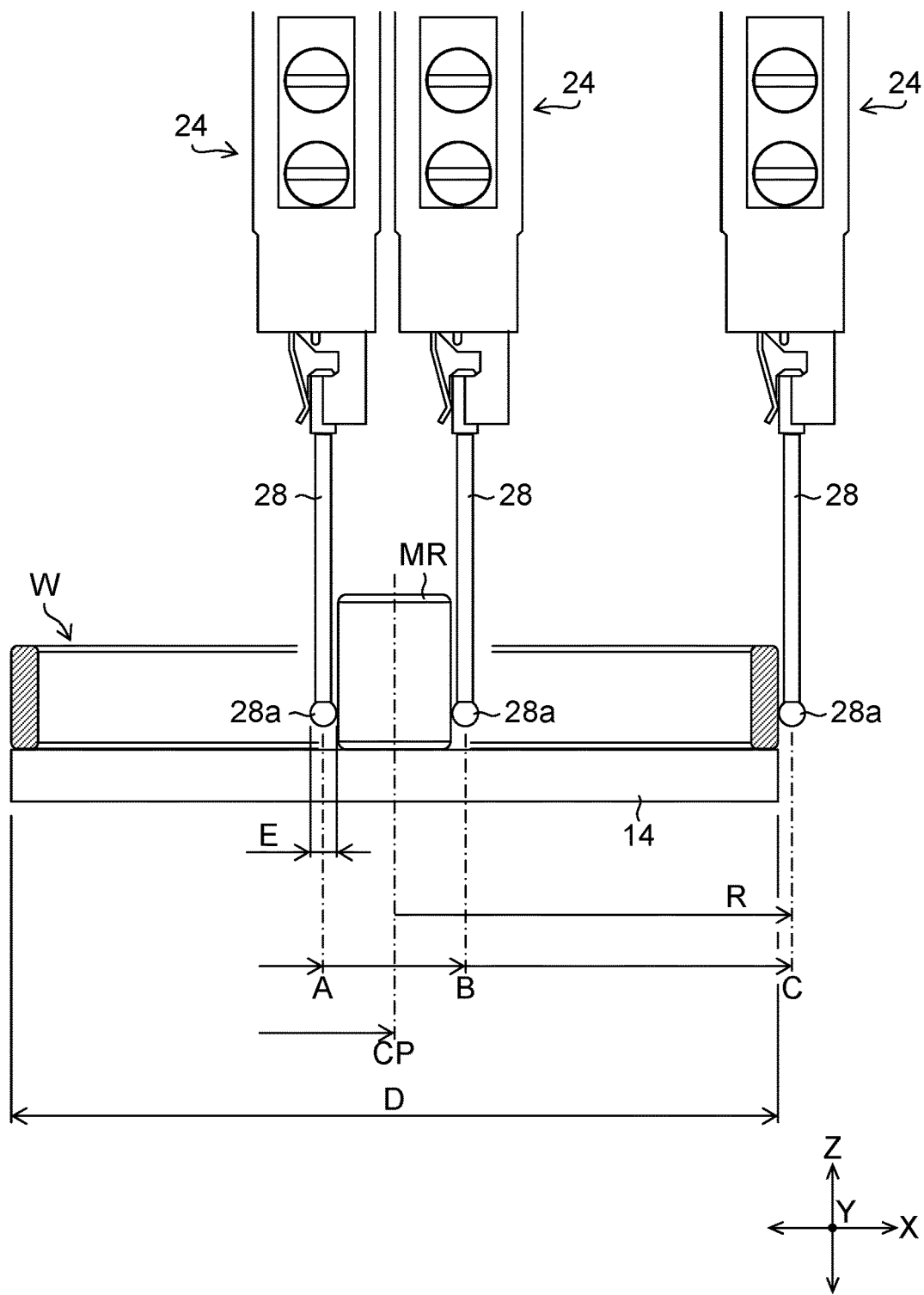
FIG. 9 is an explanatory diagram for explaining calculation of a diameter of the rotary table by a diameter calculating unit.

FIG. 9 is an explanatory diagram for explaining calculation of a diameter D of the rotary table 14 by the diameter calculating unit 56. As illustrated in FIG. 9 and FIG. 2 described above, the diameter calculating unit 56 first calculates a mean value C of the positions of the probe 28 during one rotation of the rotary table 14 based on the displacement detection signals and the position detection signals input thereto from the detection signal acquiring unit 54 in the third detection control.

Then, the diameter calculating unit 56 calculates an approximate radius R of the workpiece W based on the result of the calculation of the mean value C and results of the calculation of the mean values A and B by the rotation center calculating unit 46 described above using the formula [R=C−(A+B)/2]. The approximate radius R is the sum of the actual radius of the workpiece W and half a diameter E of the tip ball 28a (that is, the radius of the tip ball 28a). Then, the diameter calculating unit 56 calculates the diameter D of the workpiece W based on the approximate radius R and the known diameter E of the tip ball 28a using the formula [D=(R−E/2)×2]. The diameter calculating unit 56 displays the result of the calculation of the diameter D on the display unit 36 and stores the result in the storage unit (not illustrated).

Action of Present Embodiment

<Measurement of Position of Rotation Center>

Figure 10:
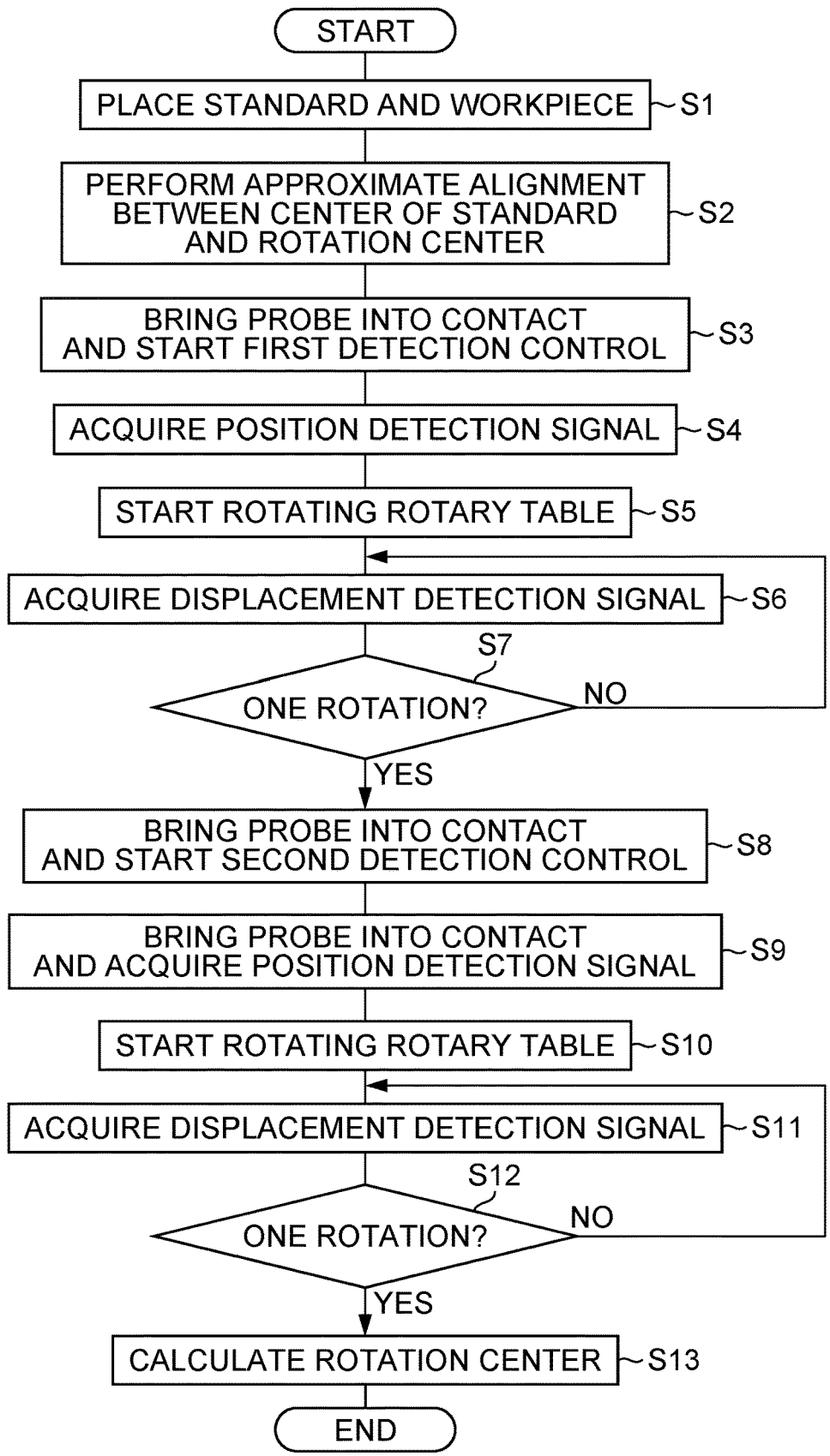
FIG. 10 is a flowchart illustrating flow of a process of measuring the position of the rotation center of the rotary table.

FIG. 10 is a flowchart illustrating flow of a process of measuring the position of the rotation center CP of the rotary table 14 according to the diameter measurement method of the present invention. As illustrated in FIG. 10, an operator first places the standard MR and the workpiece W on the rotary table 14 (step S1). Note that the workpiece W may be placed after completion of the measurement of the position of the rotation center CP. Next, the operator performs approximate alignment between the center of the standard MR and the rotation center CP through the known method using the detector 24, the rotation center adjusting mechanism 26, and the like (step S2). As described above with reference to FIGS. 6 and 7, precise alignment between the rotation center CP and the center of the standard MR is not required. Thus, it is possible to reduce the operator's time and effort and also shorten the measuring time.

After completion of step S2, as illustrated in the portion designated by reference character 3A of FIG. 3 described above, the operator brings the tip ball 28a of the probe 28 into contact with the outer circumferential face of the standard MR from the one side XL and then inputs a detection start operation on the operation unit 32 (step S3). In response to the detection start operation, the pre-detection control unit 42 and the like are activated to start the first detection control.

The pre-detection control unit 42 causes the position detecting unit 34 to output the position detection signals for the detector 24 to the pre-detection signal acquiring unit 44. Accordingly, the pre-detection signal acquiring unit 44 acquires the position detection signals and outputs the acquired position detection signals to the rotation center calculating unit 46 (step S4). Note that step S4 may be executed after step S5 or after step S7.

Further, the pre-detection control unit 42 drives the motor 15 to start rotating the rotary table 14 (step S5) and causes the detector 24 to output the displacement detection signal to the pre-detection signal acquiring unit 44. Accordingly, the pre-detection signal acquiring unit 44 acquires the displacement detection signal for the probe 28 and outputs the acquired displacement detection signal to the rotation center calculating unit 46 (step S6).

Thereafter, until the rotary table 14 makes one rotation, the process of step S6 is repeatedly executed so that the output of the displacement detection signal from the detector 24, and the acquisition of the displacement detection signal and the output of the displacement detection signal to the rotation center calculating unit 46 by the pre-detection signal acquiring unit 44 are repeatedly executed (NO in step S7).

When the rotary table 14 makes one rotation (YES in step S7), the pre-detection control unit 42 stops driving the motor 15 to stop rotating the rotary table 14. Note that steps S3 to S7 correspond to the first detection step of the present invention.

Next, as illustrated in the portion designated by reference character 3B of FIG. 3 described above, the operator brings the tip ball 28a of the probe 28 into contact with the outer circumferential face of the standard MR from the other side XR and then inputs a detection start operation on the operation unit 32 (step S8). In response to the detection start operation, the pre-detection control unit 42 and the like are activated to start the second detection control.

The pre-detection control unit 42 again causes the position detecting unit 34 to output the position detection signals for the detector 24 to the pre-detection signal acquiring unit 44. Accordingly, the pre-detection signal acquiring unit 44 acquires the position detection signals and outputs the acquired position detection signals to the rotation center calculating unit 46 (step S9). Note that step S9 may be executed after step S10 or after step S12.

Thereafter, as with the first detection control described above, rotation of the rotary table 14 is started (step S10), and the output of the displacement detection signal from the detector 24, and the acquisition of the displacement detection signal and the output of the displacement detection signal to the rotation center calculating unit 46 by the pre-detection signal acquiring unit 44 are repeatedly executed during one rotation of the rotary table 14 (step S11, NO in step S12).

When the rotary table 14 makes one rotation (YES in step S12), the pre-detection control unit 42 stops driving the motor 15 to stop rotating the rotary table 14. Note that steps S8 to S12 correspond to the second detection step of the present invention.

Next, as illustrated in FIG. 4 described above, the rotation center calculating unit 46 calculates the mean value A and the mean value B based on the displacement detection signals and the position detection signals input thereto from the pre-detection signal acquiring unit 44 in each of the first detection control and the second detection control. Then, the rotation center calculating unit 46 calculates the position of the rotation center CP [CP=(A+B)/2] based on the mean value A and the mean value B and displays the result of the calculation on the display unit 36 (step S13, corresponding to the rotation center calculating step of the present invention).

<Measurement of Diameter of Workpiece>

Figure 11:
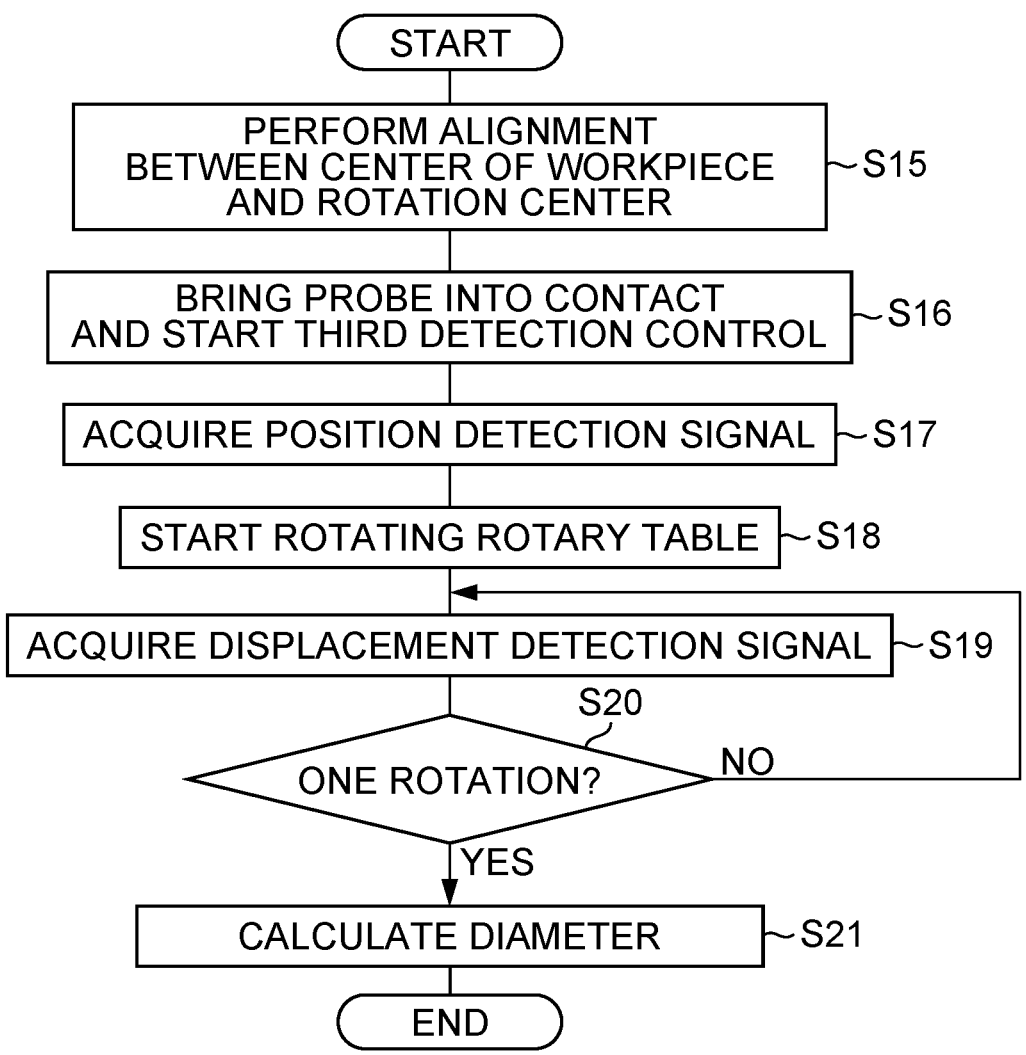
FIG. 11 is a flowchart illustrating flow of a process of measuring a diameter of a workpiece.

FIG. 11 is a flowchart illustrating flow of a process of measuring the diameter D of the workpiece W according to the diameter measurement method of the present invention. As illustrated in FIG. 11, an operator performs alignment between the center of the workpiece W and the rotation center CP based on the result of the measurement of the rotation center CP through the known method using the detector 24, the rotation center adjusting mechanism 26, and the like (step S15, corresponding to the alignment step of the present invention).

After completion of this approximate alignment, as illustrated in FIG. 8 described above, the operator brings the tip ball 28*a* of the probe 28 into contact with the outer circumferential face of the workpiece W from the other side XR and then inputs a detection start operation on the operation unit 32 (step S16). In response to the detection start operation, the detection control unit 52 and the like are activated to start the third detection control.

The detection control unit 52 causes the position detecting unit 34 to output the position detection signal for the detector 24 to the detection signal acquiring unit 54. Accordingly, the detection signal acquiring unit 54 acquires the position detection signal and outputs the acquired position detection signal to the diameter calculating unit 56 (step S17). Note that step S17 may be executed after step S18 or after step S20.

Further, the detection control unit 52 drives the motor 15 to start rotating the rotary table 14 (step S18) and causes the detector 24 to output the displacement detection signal to the detection signal acquiring unit 54. Thereafter, as with the first detection control and the second detection control, the output of the displacement detection signal from the detector 24, and the acquisition of the displacement detection signal and the output of the displacement detection signal to the diameter calculating unit 56 by the detection signal acquiring unit 54 are repeatedly executed during one rotation of the rotary table 14 (step S19, NO in step S20).

When the rotary table 14 makes one rotation (YES in step S20), the detection control unit 52 stops driving the motor 15 to stop rotating the rotary table 14. Note that steps S16 to S20 correspond to the third detection step of the present invention.

Next, as illustrated in FIG. 9 described above, the diameter calculating unit 56 calculates the mean value C based on the displacement detection signals and the position detection signals input thereto from the detection signal acquiring unit 54 in the third detection control. Then, the diameter calculating unit 56 calculates the approximate radius R [R=C−(A+B)/2] based on the mean value C and the mean values A and B previously calculated by the rotation center calculating unit 46 and calculates the diameter D [D=(R−E/2)×2] of the workpiece W based on the result of the calculation of the approximate radius R and the known diameter E of the tip ball 28*a* (step S21, corresponding to the diameter calculating step of the present invention). The result of the calculation of the diameter D is displayed on the display unit 36 and stored in the storage unit (not illustrated).

Effects of Present Embodiment

As described above, in the present embodiment, the position of the rotation center CP can be measured regardless of the presence or absence of an offset of the center of the standard MR from the rotation center CP of the rotary table 14 by executing the first detection control and the second detection control using the standard MR. This enables the alignment between the center of the workpiece W and the rotation center CP. Thus, it is possible to measure the diameter D of the workpiece W merely by causing the rotary table 14 to make one rotation in a state where the probe 28 is in contact with one detection point on the workpiece W. That is, it is not necessary to bring the probe 28 into contact with two opposite detection points on the workpiece W as conventionally performed. As a result, diameter measurement can be performed on the workpiece W having a large diameter without using a master piece and the horizontal arm 20 having a long stroke.

First Additional Embodiment

FIG. 12 is an explanatory diagram for explaining measurement of the diameter of a workpiece W whose outer circumferential face has a recessed cross-sectional shape. While, in the above embodiment, the cross-sectional shape of the outer circumferential face of the workpiece W is a planar shape, a groove 100 having a recessed shape may be formed on the outer circumferential face in the circumferential direction thereof as illustrated in FIG. 12. The present invention is applicable to measurement of the diameter D of the bottom face of the groove 100. A circularity measurement machine 10 in this case has basically the same configuration as the circularity measurement machine 10 of the above embodiment except that a probe 102 is provided instead of the probe 28. Thus, the same reference numerals or characters designate elements identical in function or configuration to those in the above embodiment, and description thereof is omitted.

The probe 102 has a tip portion 102*a* formed in a substantially inverted T shape. The tip portion 102*a* has tips 28*b* and 28*c* spaced in the X direction.

When the diameter D of the bottom face of the groove 100 is measured using the probe 102, the first detection control, the second detection control, and the third detection control are executed in a manner similar to the above embodiment. In this case, the approximate radius R described above is shifted by a distance F/2 from a tip portion center CS, which is the center of the tip portion 102*a* in the X direction, to the tip 28*b* in contact with the bottom face of the groove 100. That is, this case is equivalent to the case where the tip ball 28*a* for large diameter is used in the above embodiment. Accordingly, the diameter calculating unit 56 can obtain the diameter D of the bottom face of the groove 100 using the formula [(R−F/2)×2=(D/2)×2].

Second Additional Embodiment

FIG. 13 is an explanatory diagram for explaining an example in which the diameter of the workpiece W is measured without additionally providing the standard MR by using a portion of the workpiece W as the standard MR. As illustrated in FIG. 13, when the workpiece W is formed in a hollow cylindrical shape, that is, the workpiece W has an inner circumferential face (corresponding to the second circumferential face of the present invention) concentric with the outer circumferential face (corresponding to the first circumferential face of the present invention) as a diameter measurement target, the inner circumferential face of the workpiece W can be used as the circumferential face of the standard MR.

Specifically, as illustrated in a portion designated by reference character 13A of FIG. 13, first detection control is first executed to cause the rotary table 14 to make one rotation in a state where the tip ball 28*a* of the probe 28 is in contact with the inner circumferential face of the workpiece W from the other side XR, thereby acquiring position detection signals and displacement detection signals. Next, second detection control is executed to cause the rotary table 14 to make one rotation in a state where the tip ball 28*a* of the probe 28 is in contact with the inner circumferential face of the workpiece W from the one side XL, thereby acquiring position detection signals and displacement detection signals. Accordingly, the rotation center CP of the rotary table 14 can be measured in a manner similar to each of the above embodiments.

Then, as illustrated in a portion designated by reference character 13B of FIG. 13, third detection control is executed to cause the rotary table 14 to make one rotation in a state where the tip ball 28a of the probe 28 is in contact with the outer circumferential face of the workpiece W from the other side XR, thereby acquiring position detection signals and displacement detection signals. Accordingly, the diameter D of the workpiece W can be measured in a manner similar to each of the above embodiments.

In this manner, in the second additional embodiment, since the workpiece W can also be used as the standard MR, the cost can be reduced compared to each of the above embodiments. Also, in particular, when the inner diameter of the workpiece W is small, the diameter (outer diameter) of the workpiece W can be measured without using the horizontal arm 20 having a long stroke in a manner similar to each of the above embodiments.

Note that, while the inner circumferential face of the workpiece W having a hollow cylindrical shape is used as the standard MR to measure the diameter D of the outer circumferential face of the workpiece W, on the contrary, the outer circumferential face (second circumferential face) of the workpiece W can also be used as the standard MR to measure the diameter D of the inner circumferential face (first circumferential face) of the workpiece W.

Others

While, in each of the above embodiments, the diameter (outer diameter) of the outer circumferential face of the workpiece W having a hollow cylindrical shape is measured, the present invention is applicable to measurement of the diameter of the circumferential face of the workpiece W having various shapes (including a case where a portion of the workpiece W serves as the circumferential face) such as measurement of the diameter (outer diameter) of the outer circumferential face of the workpiece W having a solid cylindrical shape, measurement of the diameter (inner diameter) of the inner circumferential face of the workpiece W having a hollow cylindrical shape, or measurement of the diameter or the radius of any circumferential face of the workpiece W having a multiple hollow cylindrical structure. Also, measurement of the radius of each circumferential face may be performed in addition to or instead of the measurement of the diameter of each circumferential face.

While, in the embodiment and the first additional embodiment described above, the tip ball 28a of the probe 28 is brought into contact with the two detection points on the outer circumferential face of the standard MR having a solid cylindrical shape, the tip ball 28a of the probe 28 may be brought into contact with two detection points on the outer circumferential face or the inner circumferential face of the standard MR having a hollow cylindrical shape.

While, in each of the above embodiments, an operator manually brings the tip ball 28a of the probe 28 into contact with the workpiece W and the standard MR, manually performs the approximate alignment between the center of the standard MR and the rotation center CP of the rotary table 14, and manually performs the alignment between the center of the workpiece W and the rotation center CP, these may be automatically performed using, for example, a known measurement program.

While, in each of the above embodiments, the rotary table 14 is caused to make one rotation in the first detection control, the second detection control, and the third detection control, the number of rotations of the rotary table 14 is not limited to any particular number.

While the circularity measurement machine 10 of each of the above embodiments rotates the workpiece W or the standard MR and the detector 24 relative to each other around the rotation center CP by rotating the rotary table 14 on which the workpiece W and the standard MR are placed, the present invention is also applicable to the circularity measurement machine 10 of a detector rotation type that rotates the detector 24 around the rotation center CP instead of rotating the table on which the workpiece W and the standard MR are placed.

REFERENCE SIGNS LIST

10: circularity measurement machine, 12: base, 14: rotary table, 15: motor, 16: column, 18: carriage, 20: horizontal arm, 22: detector holder, 24: detector, 26: rotation center adjusting mechanism, 28: probe, 28a: tip ball, 28b, 28c: tip, 30: control device, 32: operation unit, 34: position detecting unit, 36: display unit, 40: rotation center measuring unit, 42: pre-detection control unit, 44: pre-detection signal acquiring unit, 46: rotation center calculating unit, 50: diameter measuring unit, 52: detection control unit, 54: detection signal acquiring unit, 56: diameter calculating unit, 100: groove, 102: probe, 102a: tip portion, A, B, C: mean value, CP: rotation center, CS: tip portion center, MR: standard, R: approximate radius, W: workpiece, XL: one side, XR: another side

What is claimed is:

1. A workpiece diameter measurement method for measuring a diameter of a workpiece using a circularity measurement machine that rotates the workpiece placed on a table and a detector relative to each other around a rotation center in a state where a probe of the detector is in contact with a circumferential face of the workpiece, the workpiece diameter measurement method comprising:
   a first detection step of detecting positions of the probe while rotating a standard uncalibrated and placed on the table and the detector relative to each other around the rotation center in a state where the probe is in contact with a circumferential face of the standard from one side in a displacement direction of the probe;
   a second detection step of detecting positions of the probe while rotating the standard and the detector relative to each other around the rotation center in a state where the probe is in contact with the circumferential face of the standard from another side in the displacement direction;
   a rotation center calculating step of calculating a position of the rotation center based on the positions of the probe detected in the first detection step and the second detection step;
   a third detection step of detecting positions of the probe while rotating the workpiece and the detector relative to each other around the rotation center in a state where the probe is in contact with the workpiece from the other side; and
   a diameter calculating step of calculating a diameter of the circumferential face of the workpiece based on the positions of the probe detected in the first detection step, the second detection step, and the third detection step.

2. The workpiece diameter measurement method according to claim 1, wherein the standard and the detector are rotated relative to each other around the rotation center by rotating the table, and in the rotation center calculating step, the position CP of the rotation center is calculated by using a formula $[CP=A+(B-A)/2=(A+B)/2]$, where A is a mean value of the positions of the detector detected in the first detection step, and B is a mean value of the positions of the detector detected in the second detection step.

3. The workpiece diameter measurement method according to claim 2, wherein the workpiece and the detector are rotated relative to each other around the rotation center by rotating the table, and in the diameter calculating step, an approximate radius R of the workpiece is calculated by using a formula $[R=C-(A+B)/2]$, and the diameter D of the circumferential face of the workpiece is calculated by using a formula $[D=(R-E/2)\times 2]$, where C is a mean value of the positions of the detector detected in the third detection step, and E is a diameter of a tip ball of the probe.

4. The workpiece diameter measurement method according to claim 1, wherein, when the workpiece has a first circumferential face serving as the circumferential face of the workpiece and a second circumferential face concentric with the first circumferential face, the second circumferential face is used as the circumferential face of the standard.

5. A circularity measurement machine that rotates a workpiece placed on a table and a detector relative to each other around a rotation center in a state where a probe of the detector is in contact with a circumferential face of the workpiece, the circularity measurement machine comprising:

a first detection control unit that detects positions of the probe while rotating a standard uncalibrated and placed on the table and the detector relative to each other around the rotation center in a state where the probe is in contact with a circumferential face of the standard from one side in a displacement direction of the probe;

a second detection control unit that detects positions of the probe while rotating the standard and the detector relative to each other around the rotation center in a state where the probe is in contact with the circumferential face of the standard from another side in the displacement direction;

a rotation center calculating unit that calculates a position of the rotation center based on the positions of the probe detected by the first detection control unit and the second detection control unit;

a third detection control unit that detects positions of the probe while rotating the workpiece and the detector relative to each other around the rotation center in a state where the probe is in contact with the workpiece from the other side; and a diameter calculating unit that calculates a diameter of the circumferential face of the workpiece based on the positions of the probe detected by the first detection control unit, the second detection control unit, and the third detection control unit.

* * * * *